(12) United States Patent
Yoo

(10) Patent No.: US 11,912,330 B1
(45) Date of Patent: Feb. 27, 2024

(54) MODULAR STEERING WHEEL ASSEMBLY FOR A VEHICLE

(71) Applicant: GM Global Technology Operations LLC, Detroit, MI (US)

(72) Inventor: Dong Yeon Yoo, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/085,039

(22) Filed: Dec. 20, 2022

(51) Int. Cl.
*B62D 1/04* (2006.01)

(52) U.S. Cl.
CPC ..................................... *B62D 1/04* (2013.01)

(58) Field of Classification Search
CPC ... B62D 1/04; B62D 1/06; B62D 1/08; B62D 1/10; Y10T 74/20834; Y10T 29/49488
See application file for complete search history.

(56) References Cited

U.S. PATENT DOCUMENTS

| | | | | |
|---|---|---|---|---|
| 1,091,932 A * | 3/1914 | Hill | ........................ | B62D 1/04 74/552 |
| 1,426,773 A * | 8/1922 | Reck | ....................... | B62D 1/04 74/556 |
| 4,887,484 A * | 12/1989 | Peng | ..................... | B60R 25/022 70/252 |
| 5,896,661 A * | 4/1999 | Worrell | .................... | B62D 1/11 74/552 |
| 6,437,265 B1 * | 8/2002 | Kreuzer | ................... | B62D 1/04 200/61.54 |
| 9,168,943 B2 * | 10/2015 | Greppi | ..................... | B62D 1/06 |
| 2021/0316776 A1 * | 10/2021 | Ko | .......................... | B62D 1/06 |

FOREIGN PATENT DOCUMENTS

| | | | | |
|---|---|---|---|---|
| CN | 110171464 A | * | 8/2019 | ............. B62D 1/06 |
| CN | 111776058 A | * | 10/2020 | |
| CN | 113232713 A | * | 8/2021 | |

OTHER PUBLICATIONS

EPO Machine Translation of the Description of CN 113232713 A, Cao et al., Aug. 10, 2021. (Year: 2023).*

* cited by examiner

*Primary Examiner* — Daniel D Yabut
(74) *Attorney, Agent, or Firm* — CANTOR COLBURN LLP

(57) ABSTRACT

A modular steering wheel assembly includes a central hub having a center support, a first support element extending outwardly from the center support in a first direction and a second support element extending outwardly from the center support in a second direction. The first support element includes a first connector member and a second connector member, and the second support element includes a first connector element and a second connector element. A first steering wheel member is detachably connected to at least one of the first connector member and the second connector member, and a second steering wheel member is detachably connected to at least one of the first connector element and the second connector element.

18 Claims, 4 Drawing Sheets

MODULAR STEERING WHEEL ASSEMBLY FOR A VEHICLE

INTRODUCTION

The subject disclosure relates to the art of steering wheels and, more particularly, to a modular steering wheel assembly for a vehicle.

Most vehicles include a steering mechanism of some form. A typical passenger vehicle includes a steering wheel assembly having a central hub. The central hub serves as an interface between the steering wheel and a steering column of a vehicle. In a typical passenger vehicle, the central hub supports a steering wheel rim. Steering wheel assemblies come in a variety of styles and may be formed from or covered by various materials. The steering wheel rim is typically round or generally round, sometimes polygonal, and may be covered by a non-slip material such as plastic, leather, or the like.

Overtime, constant contact with a driver's hands will cause the material on the steering rim to wear. The extent of the wear differs for every driver, but typically occurs in two locations on the member where the constant contact occurs most frequently. Regardless, replacing the material is often not an option. That is, instead of replacing the material, the entire steering wheel assembly is removed and replaced. Further, changing an appearance of a steering wheel also requires total replacement of the steering wheel assembly. A user that may want a sportier looking or a simply different steering wheel style has no choice but to completely replace the part that came with the vehicle at the time of purchase. Accordingly, it is desirable to provide, a steering wheel that includes portions that may be readily replaced in order to refresh the covering material or change an overall component shape and appearance based on driver preferences

SUMMARY

A modular steering wheel assembly, in accordance with a non-limiting example, includes a central hub having a center support, a first support element extending outwardly from the center support in a first direction and a second support element extending outwardly from the center support in a second direction. The first support element includes a first connector member and a second connector member, and the second support element includes a first connector element and a second connector element. A first steering wheel member is detachably connected to at least one of the first connector member and the second connector member, and a second steering wheel member is detachably connected to at least one of the first connector element and the second connector element.

In addition to one or more of the features described herein the second steering wheel member is connected to each of the first connector element and the second connector element.

In addition to one or more of the features described herein the first steering wheel member includes a first end connected to the first connector member and a second end connected to the second connector member and an intermediate portion extending between the first end and the second end.

In addition to one or more of the features described herein the first steering wheel member includes a hub support coupled to the central hub.

In addition to one or more of the features described herein the hub support includes a first hub support member and a second hub support member spaced from the first hub support member, each of the first hub support member and the second hub support member extending outwardly from the first steering wheel member between the first end and the second end.

In addition to one or more of the features described herein the intermediate portion includes a substantially straight section.

In addition to one or more of the features described herein the second steering wheel member includes a first end portion connected to the first connector element, a second end portion connected to the second connector element, and an intermediate section extending un-interrupted between the first end portion and the second end portion.

In addition to one or more of the features described herein the intermediate section including a substantially straight section.

In addition to one or more of the features described herein the modular steering wheel assembly includes a third steering wheel member, wherein the second steering wheel member includes a first end portion detachably connected to the first connector element and a second end portion that is cantilevered from the central hub and the third steering wheel member includes a first end section detachably connected to the second connector element and a second end section that is cantilevered from the central hub.

In addition to one or more of the features described herein the modular steering wheel assembly includes a fourth steering wheel member extending between and connecting the second end portion of the second steering wheel member and the second end section of the third steering wheel member.

A vehicle, in accordance with a non-limiting example, includes a body defining a passenger compartment and a modular steering wheel assembly arranged in the passenger compartment. The modular steering wheel assembly includes a central hub having a center support, a first support element extending outwardly from the center support in a first direction and a second support element extending outwardly from the center support in a second direction. The first support element includes a first connector member and a second connector member, and the second support element including a first connector element and a second connector element. A first steering wheel member is detachably connected to at least one of the first connector member and the second connector member and a second steering wheel member is detachably connected to at least one of the first connector element and the second connector element.

In addition to one or more of the features described herein the second steering wheel member is connected to each of the second connector member and the second connector element.

In addition to one or more of the features described herein the first steering wheel member includes a first end connected to the first connector member and a second end connected to the second connector member and an intermediate portion extending between the first end and the second end.

In addition to one or more of the features described herein the first steering wheel member includes a hub support coupled to the central hub.

In addition to one or more of the features described herein the hub support includes a first hub support member and a second hub support member spaced from the first hub support member, each of the first hub support member and the second hub support member extending outwardly from the first steering wheel member between the first end and the second end.

In addition to one or more of the features described herein the intermediate portion includes a substantially straight section.

In addition to one or more of the features described herein the second steering wheel member includes a first end portion connected to the first connector element, a second end portion connected to the second connector element, and an intermediate section extending un-interrupted between the first end portion and the second end portion.

In addition to one or more of the features described herein the intermediate section including a substantially straight section.

In addition to one or more of the features described herein the steering wheel assembly includes a third steering wheel member, wherein the second steering wheel member includes a first end portion detachably connected to the first connector element and a second end portion that is cantilevered from the central hub and the third steering wheel member includes a first end section detachably connected to the second connector element and a second end section that is cantilevered from the central hub.

In addition to one or more of the features described herein the steering wheel assembly includes a fourth steering wheel member extending between and connecting the second end portion of the second steering wheel member and the second end section of the third steering wheel member.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
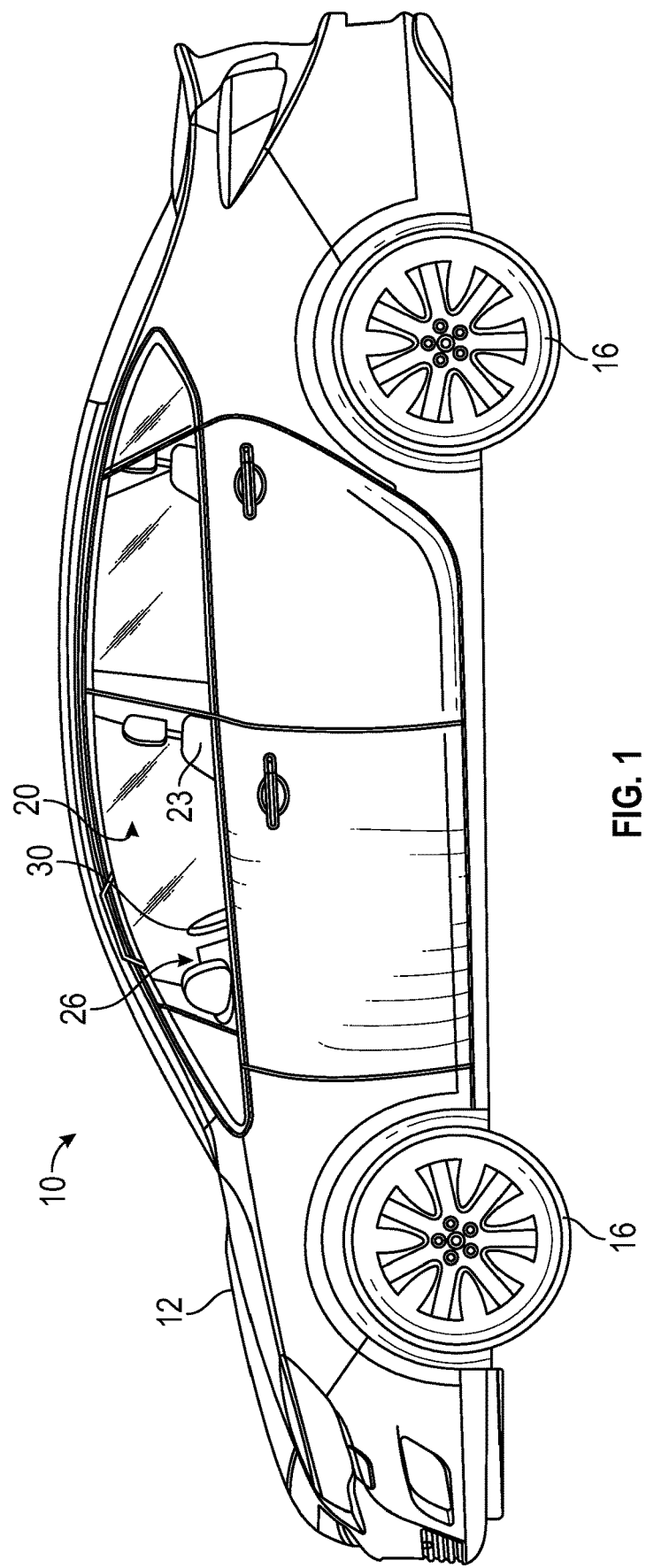
FIG. 1 is a left side view of a vehicle including a modular steering wheel assembly, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 supported on a plurality of wheels 16. At least two of the plurality of wheels 16 are steerable. That is, changing a position of two of the plurality of wheels 16 relative to body 12 will cause vehicle 10 to change direction. Body 12 defines, in part, a passenger compartment 20 having seats, one of which is indicated at 23, positioned behind a dashboard 26. A modular steering wheel assembly 30 is arranged between seats 23 and dashboard 26. Modular steering wheel assembly 30 is operated to control the orientation of the steerable wheels.

Figure 3:
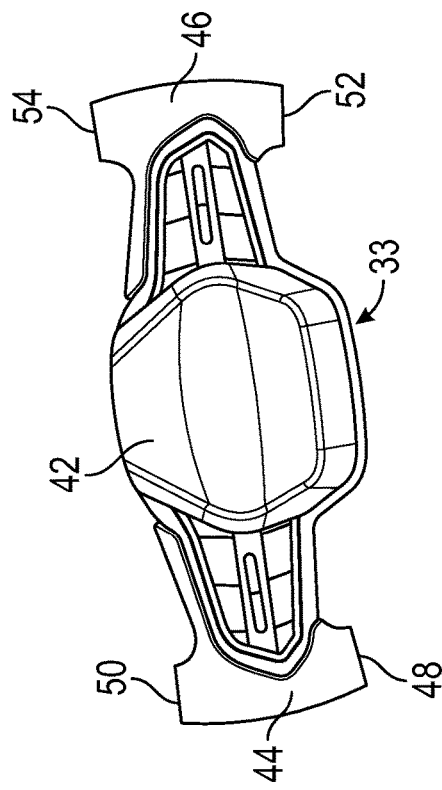
FIG. 3 is an elevational view of a central hub of the modular steering wheel assembly, in accordance with a non-limiting example.
Figure 2:
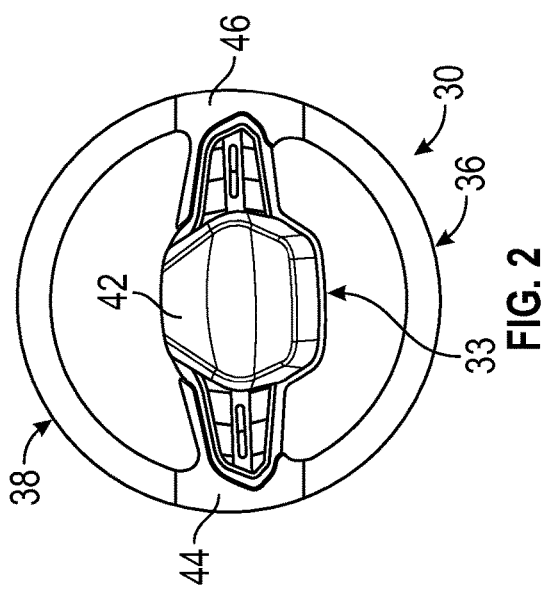
FIG. 2 is an is an elevational view of a modular steering wheel assembly, in accordance with a non-limiting example.

Referring to FIGS. 2 and 3, modular steering wheel assembly 30 include a central hub 33 to which are detachably mounted a first steering wheel member 36 and a second steering wheel member 38. Central hub 33 includes a central hub 42 that houses, for example, an airbag, a horn switch and the like, a first support element 44 and a second support element 46. First support element 44 extends outwardly from central hub 42 in a first direction and second support element 46 extends outwardly from central hub 42 in a second direction. In a non-limiting example, the second direction is about substantially opposite the first direction.

In a non-limiting example shown in FIG. 3, first support element 44 includes a first connector member 48 and a first connector element 50. First connector element 50 is oriented about 180° or substantially directly opposite first connector member 48. Similarly, second support element 46 includes a second connector member 52 and a second connector element 54. In a non-limiting example, second connector element 54 is oriented about 180° or substantially opposite second connector member 52.

Figure 4B:
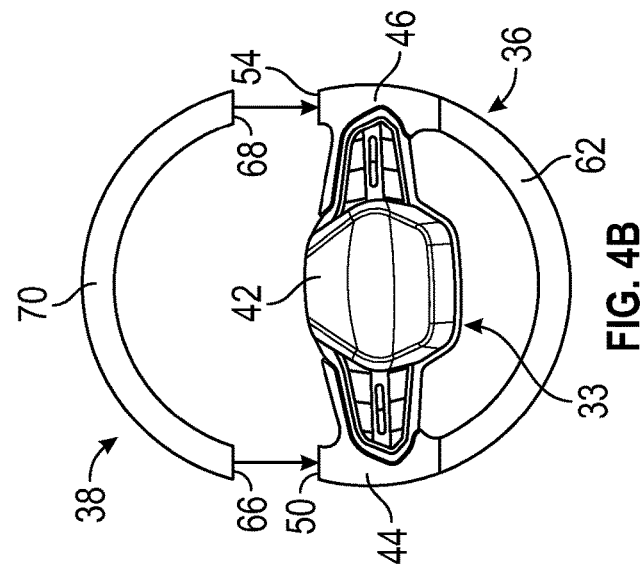
FIG. 4B is an elevational view of the central hub of FIG. 3A receiving to receive a second steering wheel member, in accordance with a non-limiting example'
Figure 4A:
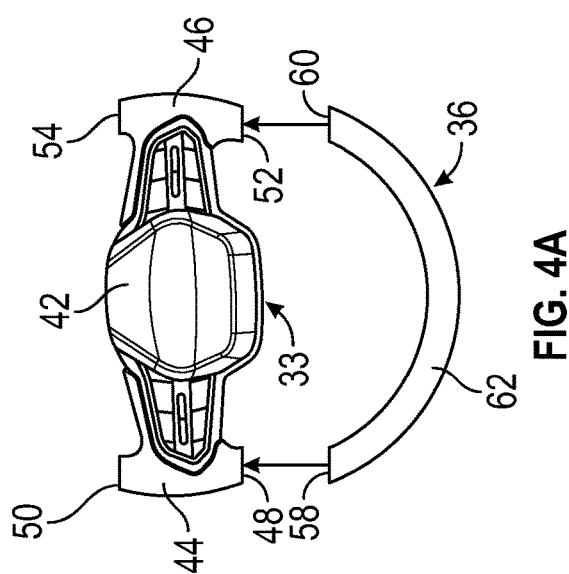
FIG. 4A is an elevational view of a first steering wheel member being joined to the central hub of FIG. 2, in accordance with a non-limiting example.

Referring to FIG. 4A, first steering wheel member 36 includes a first end 58 and a second end 60. An intermediate portion 62 extends between first end 58 and second end 60. First end 58 is detachably connected to first connector member 48 and second end 60 is detachably mounted to second connector member 52. At this point, it should be understood that the term "detachably mounted" defines a connection that can be disconnected without cutting or destroying any components and that the connection can be readily re-established.

Second steering wheel member 38, in accordance with a non-limiting example shown in FIG. 4B, includes a first end portion 66 and a second end portion 68. An intermediate section 70 extends between first end portion 66 and second end portion 68. First end portion 66 is detachably connected to first connector element 50 and second end portion 68 is detachably connected to second connector element 54. With this construction, first steering wheel member 36 and/or second steering wheel member 38 may be readily removed from central hub 33 and replaced as desired. The replacement may be to refresh worn surfaces, change materials, change colors or the like.

Figure 5C:
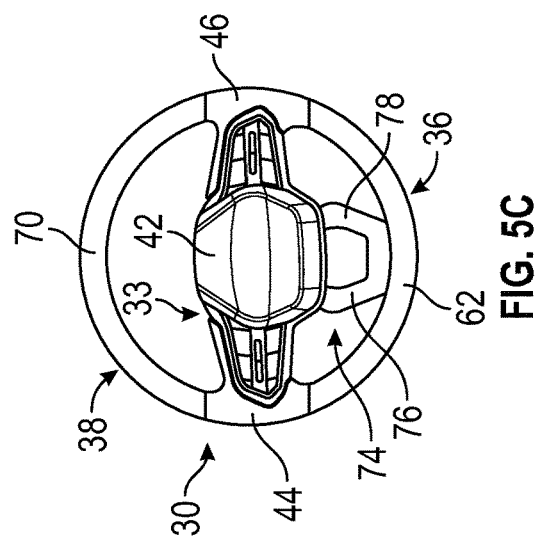
FIG. 5C is an elevational view of the central hub of FIG. 4B including both the first and second steering wheel members, in accordance with a non-limiting example.
Figure 5B:
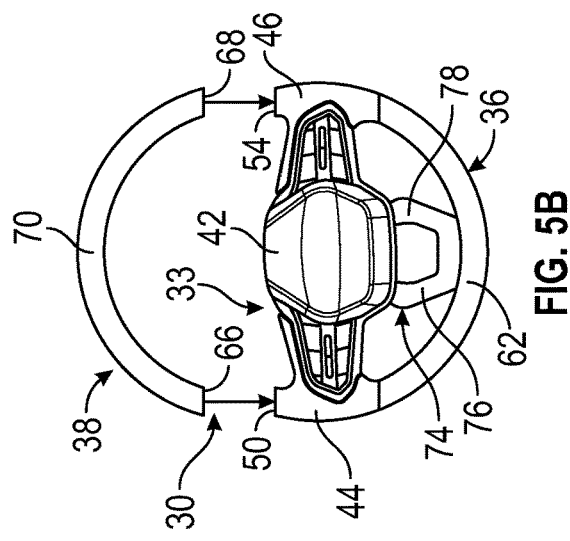
FIG. 5B is an elevational view of the central hub of FIG. 4A receiving a second steering wheel member, in accordance with a non-limiting example.
Figure 5A:
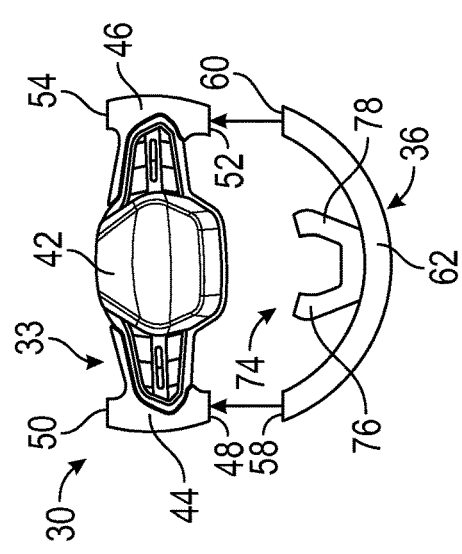
FIG. 5A is an elevational view of the central hub of FIG. 2 receiving a first steering wheel member including hub supports, in accordance with a non-limiting example.

Referring to FIG. 5A, first steering wheel member 36 is shown to include a hub support 74 in accordance with a non-limiting example. Hub support 74 in addition to increasing support for first steering wheel member 36, also provides additional contact area for a driver as well as may provide structure for additional vehicle controls (not shown). Hub support 74 includes a first hub support member 76 and a second hub support member 78 that project outwardly from intermediate portion 62 and connect with central hub 33 as shown in FIG. 5C. First and second hub support members 76 and 78 are mechanically connected to central hub 33 and, in a non-limiting example, may also establish an electrical pathway. Second steering wheel member 38 is connected to central hub 33 to form modular steering wheel assembly 30 as shown in FIG. 5C.

Figure 6C:
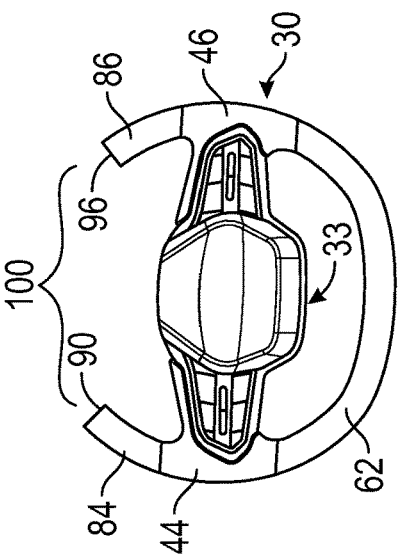
FIG. 6C is an elevational view of the central hub of FIG. 5B including the first, second, and third steering wheel members, in accordance with a non-limiting example.
Figure 6B:
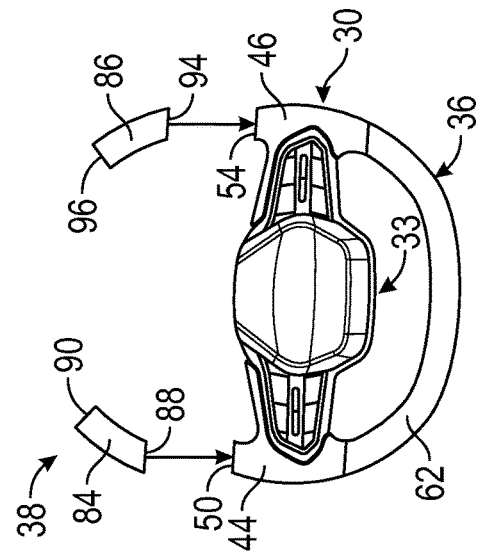
FIG. 6B is an elevational view of the central hub of FIG. 5A receiving a second steering wheel member and a third steering wheel member, in accordance with a non-limiting example.
Figure 6A:
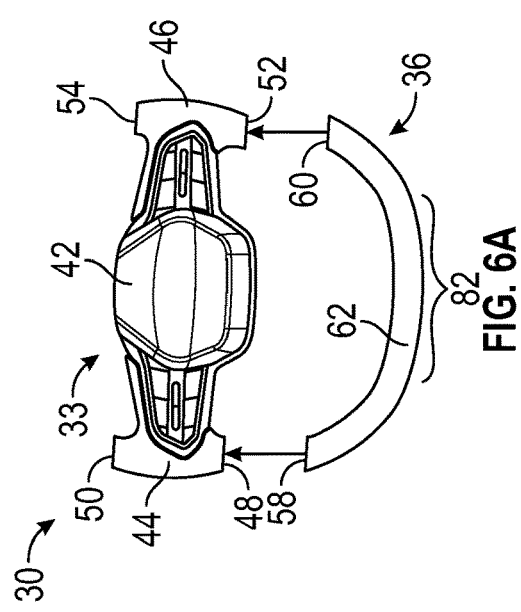
FIG. 6A is an elevational view of the central hub of FIG. 2 receiving a first steering wheel member, in accordance with a non-limiting example.

Referring to FIG. 6A, intermediate portion 62 of first steering wheel member 36 includes a substantially straight section 82. First steering wheel member 36 is connected to central hub 33 by detachably connecting first end 58 with first connector member 48 and second end 60 with second connector member 52 as shown in FIG. 6A. Shown in FIG. 6B, modular steering wheel assembly 30 includes a second steering wheel member 84 and a third steering wheel member 86.

In a non-limiting example, second steering wheel member 84 includes a first end portion 88 connected to first connector element 50 and a second end portion 90 that is cantilevered from central hub 33. Similarly, third steering wheel member 86 includes a first end section 94 connected to second connector element 54 and second end section 96 that is cantilevered from central hub 33. Second end portion 90 of second steering wheel member 84 and second end section 96 of third steering wheel member 86 are spaced from one another by a gap 100. By adding second steering wheel member 84 and third steering wheel member 86 to central hub 33, modular steering wheel assembly has a sportier appearance with a yoke geometry. Further, if desired to change the appearance, second and third steering wheel members 84 and 86 may be readily replaced with another option.

Figure 7:
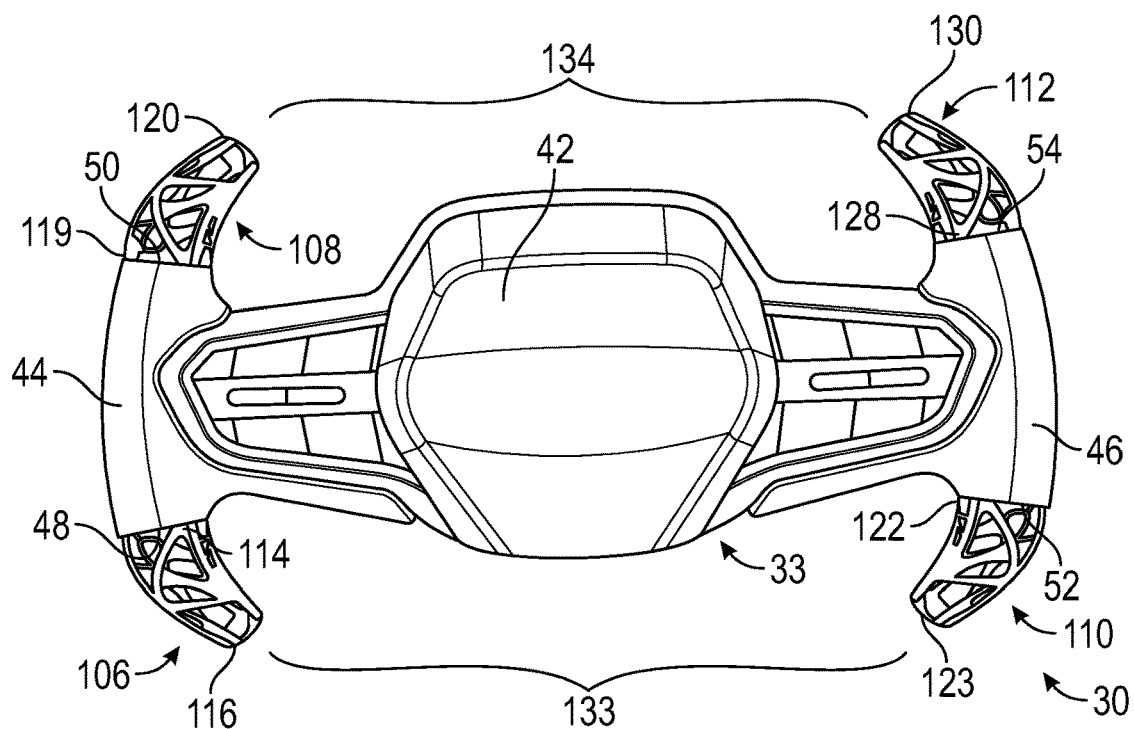
FIG. 7 is an elevational view of the central hub of FIG. 2 receiving a first steering wheel member, a second steering wheel member, a third steering wheel member, and a fourth steering wheel member, in accordance with a non-limiting example.

FIG. 7 depicts modular steering wheel assembly 30 in accordance with another non-limiting example. First support element 44 supports a first steering wheel member 106 and a second steering wheel member 108, and second support element 46 supports a third steering wheel member 110 and a fourth steering wheel member 112. First, second, third, and fourth steering wheel members 106, 108, 110, and 112 may be formed by additive manufacturing and include an open framework design. The use of additive manufacturing for components of steering wheel assembly 30 provides an enhanced level of customization to the user in terms of appearance through shapes and geometries that are not otherwise possible and/or practical using traditional manufacturing methods.

In a non-limiting example, first steering wheel member 106 includes a first end 114 connected to first connector member 48 and a second end 116 that is cantilevered from central hub 33. Second steering wheel member 108 includes a first end portion 119 connected to first connector element 50 and a second end portion 120 that is cantilevered from central hub 33. Third steering wheel member 110 includes a first end section 122 connected to second connector member 52 and a second end section 123 cantilevered from central hub 33. Fourth steering wheel member 112 includes a first end segment 128 connected to second connector element 54 and a second end segment 130 that is cantilevered from central hub 33. Second end 116 is spaced from second end section 123 by a first gap 133 and second end portion 120 is spaced from second end segment 130 by a second gap 134.

Figure 8:
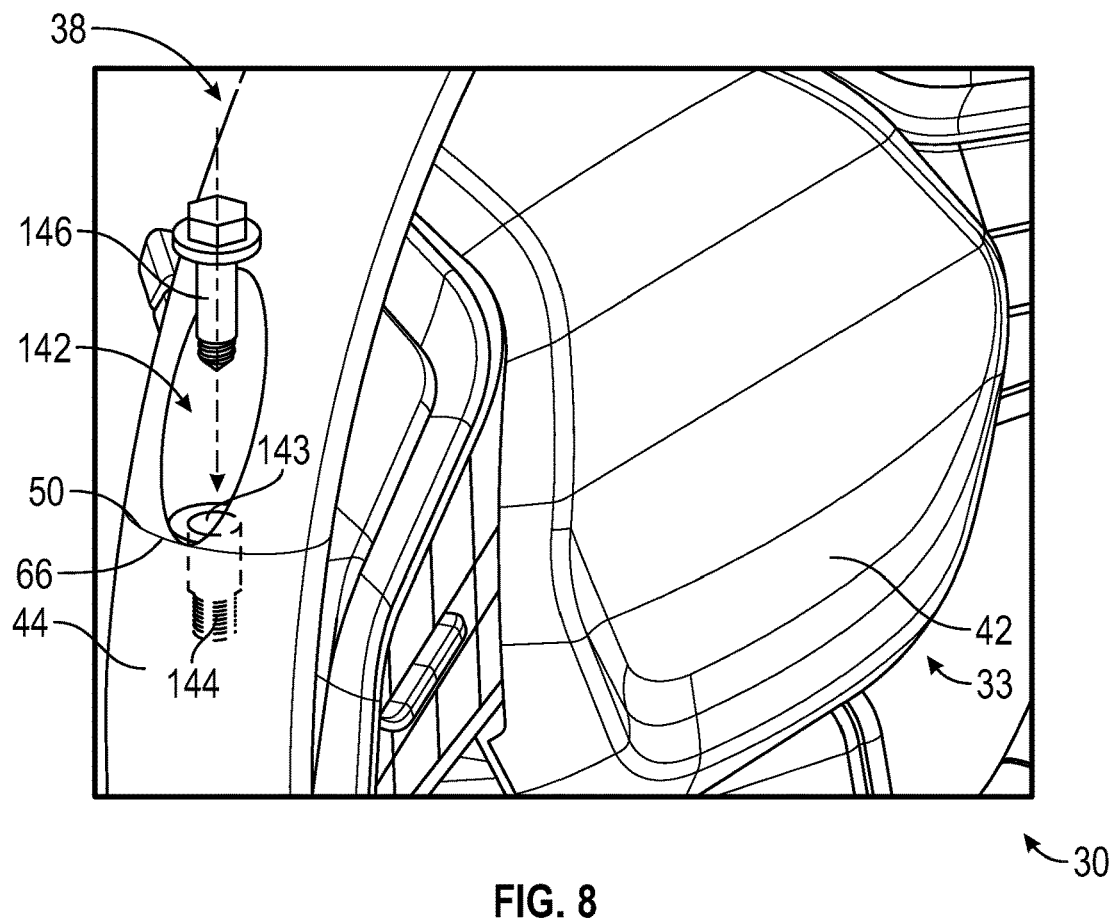
FIG. 8 is a partial perspective view of a fastener for joining a first end portion of the second steering wheel member to a first connector on the central hub, in accordance with a non-limiting example.

Reference will now follow to FIG. 8 in describing a detachable connection between first connector element 50 and first end portion 66 of second steering wheel member 38. It should be understood that connections to first connector member 48, second connector member 52, and second connector element 54 include similar structure. In a non-limiting example, first end portion 66 of second steering wheel member 38 include a recess 142 including a first opening 144. First connector element 50 includes a first threaded passage 144 that may be brought into alignment with the first opening 143. A fastener 146 passes through the opening in first end portion 66 and engages threads (not shown) in second opening 144, and tightened. Once tightened, a cover (not shown) is placed in recess 142 to hide fastener 146 and to provide a smooth rim appearance with reduced visibility of recess 142.

At this point, it should be appreciated that the disclosed modular steering wheel assembly includes readily replaceable components that may be exchanged to replace worn surfaces or simply change an aesthetic of the vehicle. Steering wheel members may take on a variety of shapes and forms and could be formed from a wide array of materials. Steering wheel members may be formed from plastics, metals, carbon fiber and the like. The steering wheel members may be covered by a wide array of materials including leather, cloth, and the like. The number of options for creating a steering wheel are limited only by the imagination of the user.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A modular steering wheel assembly comprising:
  a central hub having a center support, a first support element extending outwardly from the center support in a first direction and a second support element extending outwardly from the center support in a second direction, the first support element including a first connector member and a first connector element, and the second support element including a a second connector member and a second connector element;
  a supplemental restraint system including an airbag mounted in the central hub;
  a first steering wheel member non-foldably detachably connected to at least one of the first connector member and the second connector member;
  a second steering wheel member non-foldably detachably connected to at least one of the first connector element and the second connector element, and
  the first steering wheel member includes a hub support coupled to the central hub.

2. The modular steering wheel assembly according to claim 1, wherein the hub support includes a first hub support member and a second hub support member spaced from the first hub support member, each of the first hub support member and the second hub support member extending outwardly from the first steering wheel member between the first end and the second end.

3. The modular steering wheel assembly according to claim 1, wherein the second steering wheel member is connected to each of the first connector element and the second connector element.

4. The modular steering wheel assembly according to claim 3, wherein the first steering wheel member includes a first end connected to the first connector member and a second end connected to the second connector member and an intermediate portion extending between the first end and the second end.

5. The modular steering wheel assembly according to claim 4, wherein the intermediate portion includes a substantially straight section.

6. The modular steering wheel assembly according to claim 3, wherein the second steering wheel member includes a first end portion connected to the first connector element, a second end portion connected to the second connector element, and an intermediate section extending un-interrupted between the first end portion and the second end portion.

7. The modular steering wheel assembly according to claim 6, wherein the intermediate section including a substantially straight section.

8. The modular steering wheel assembly according to claim 1, further comprising a third steering wheel member, wherein the second steering wheel member includes a first end portion detachably connected to the first connector element and a second end portion that is cantilevered from the central hub and the third steering wheel member includes a first end section detachably connected to the second connector element and a second end section that is cantilevered from the central hub.

9. The modular steering wheel assembly according to claim 8, further comprising a fourth steering wheel member extending between and connecting the second end portion of the second steering wheel member and the second end section of the third steering wheel member.

10. A vehicle comprising:
  a body defining a passenger compartment; and
  a modular steering wheel assembly arranged in the passenger compartment, the modular steering wheel assembly comprising:
  a central hub having a center support, a first support element extending outwardly from the center support in a first direction and a second support element extending outwardly from the center support in a second direction, the first support element including a first connector member and a first connector element, and the second support element including a second connector member and a second connector element;
  a supplemental restraint system including an airbag mounted in the central hub;
  a first steering wheel member non-foldably detachably connected to at least one of the first connector member and the second connector member;
  a second steering wheel member non-foldably detachably connected to at least one of the first connector element and the second connector element, and
  the first steering wheel member includes a hub support coupled to the central hub.

11. The modular steering wheel assembly according to claim 10, wherein the hub support includes a first hub support member and a second hub support member spaced from the first hub support member, each of the first hub support member and the second hub support member extending outwardly from the first steering wheel member between the first end and the second end.

12. The modular steering wheel assembly according to claim 10, wherein the second steering wheel member is connected to each of the second connector member and the second connector element.

13. The modular steering wheel assembly according to claim 12, wherein the first steering wheel member includes a first end connected to the first connector member and a second end connected to the second connector member and an intermediate portion extending between the first end and the second end.

14. The modular steering wheel assembly according to claim 13, wherein the intermediate portion includes a substantially straight section.

15. The modular steering wheel assembly according to claim 12, wherein the second steering wheel member includes a first end portion connected to the first connector element, a second end portion connected to the second connector element, and an intermediate section extending un-interrupted between the first end portion and the second end portion.

16. The modular steering wheel assembly according to claim 15, wherein the intermediate section including a substantially straight section.

17. The modular steering wheel assembly according to claim 10, further comprising a third steering wheel member, wherein the second steering wheel member includes a first end portion detachably connected to the first connector element and a second end portion that is cantilevered from the central hub and the third steering wheel member includes a first end section detachably connected to the second connector element and a second end section that is cantilevered from the central hub.

18. The modular steering wheel assembly according to claim 17, further comprising a fourth steering wheel member extending between and connecting the second end portion of the second steering wheel member and the second end section of the third steering wheel member.

* * * * *